United States Patent [19]

Holben

[11] 3,793,882

[45] Feb. 26, 1974

[54] MEASURING FUEL CONSUMPTION
[75] Inventor: Eugene F. Holben, Haddonfield, N.J.
[73] Assignee: Conoflow Corporation, Blenheim, N.J.
[22] Filed: Oct. 20, 1971
[21] Appl. No.: 190,838

[52] U.S. Cl. ............................. 73/113, 235/150.21
[51] Int. Cl. .......................................... G01m 15/00
[58] Field of Search .. 73/113, 114, 115, 116, 117.2, 73/117.3; 235/61 J, 150.21

[56] References Cited
UNITED STATES PATENTS
3,722,265  3/1973  Metz et al. .......................... 73/117.3
3,006,144  10/1961  Arnett et al. ...................... 73/113 X
3,677,075  7/1972  Scott .................................. 73/117.3

Primary Examiner—Richard C. Queisser
Assistant Examiner—Stephen A. Kreitman
Attorney, Agent, or Firm—John T. O'Halloran; Menotti J. Lombardi, Jr.

[57] ABSTRACT

Apparatus and methods are described for measuring fuel consumption of an engine accelerating at constant load. The arrangements disclosed provide for detecting a plurality of predetermined engine rpm speeds and for generating a condition when each of said speeds is reached. In response to these conditions, the arrangements register and store an indication of the quantity of fuel per unit time being consumed at each of the plurality of speeds. The arrangements are controlled so that the measurements are sequentially made during acceleration of the engine, and so that the measurements can be selectably read out at a later time.

9 Claims, 5 Drawing Figures

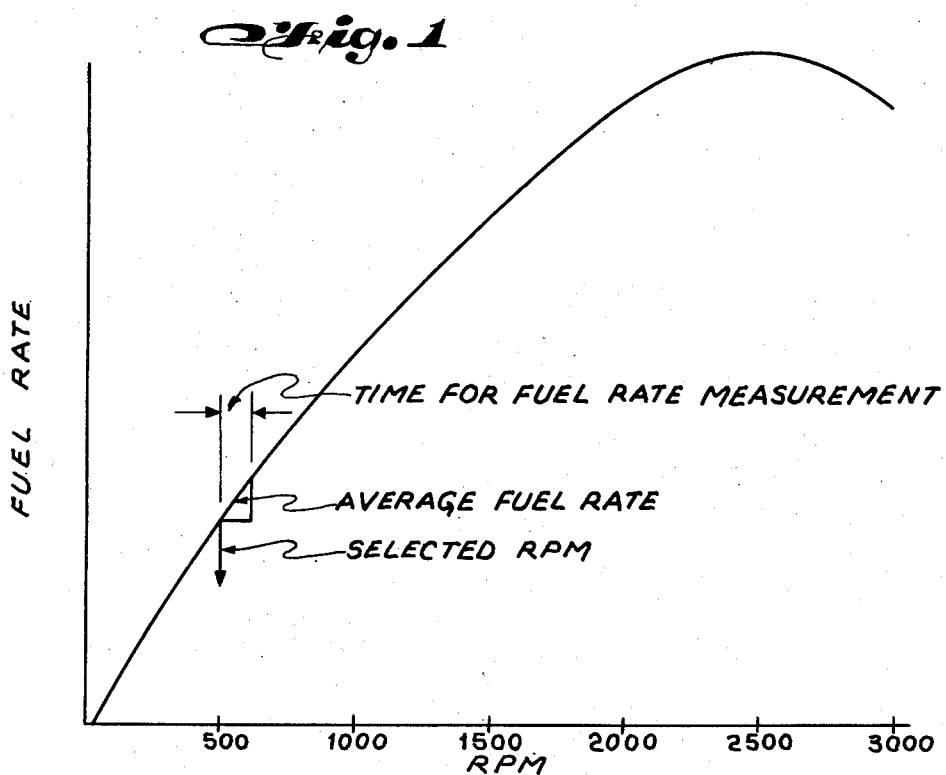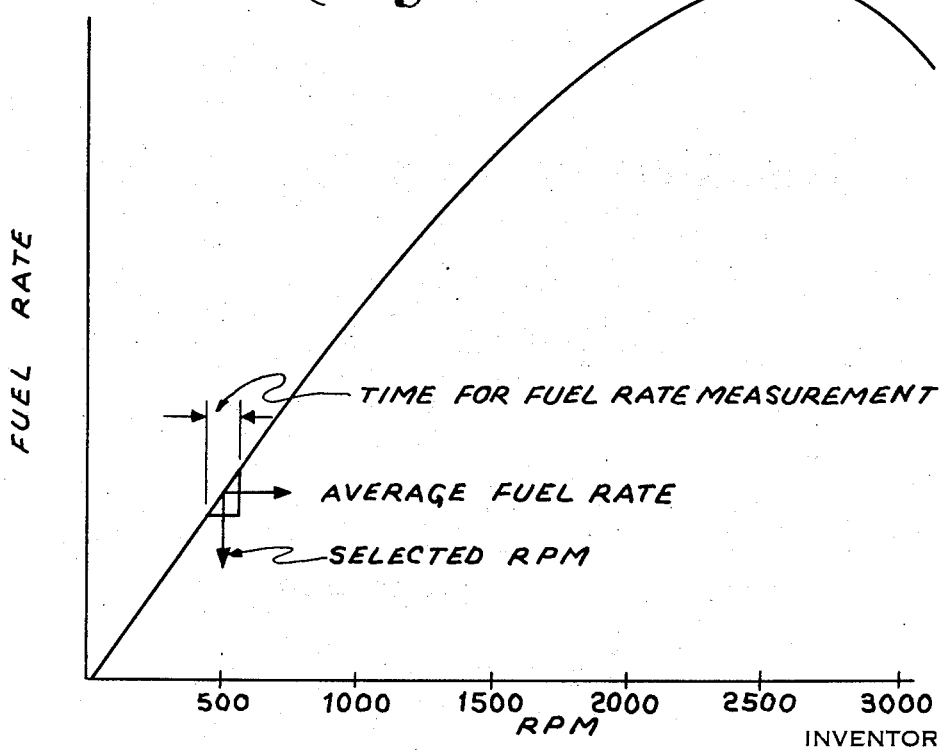

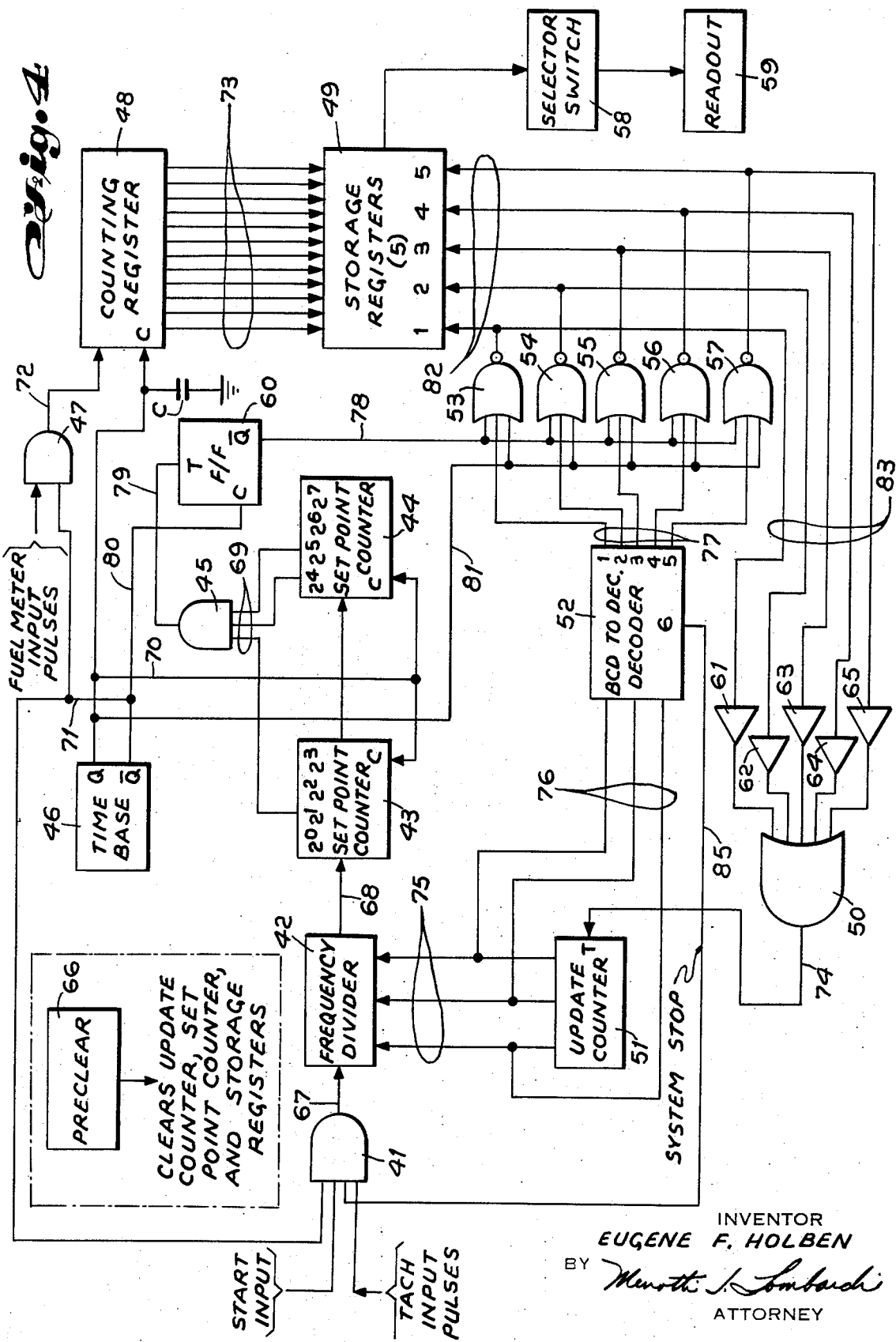

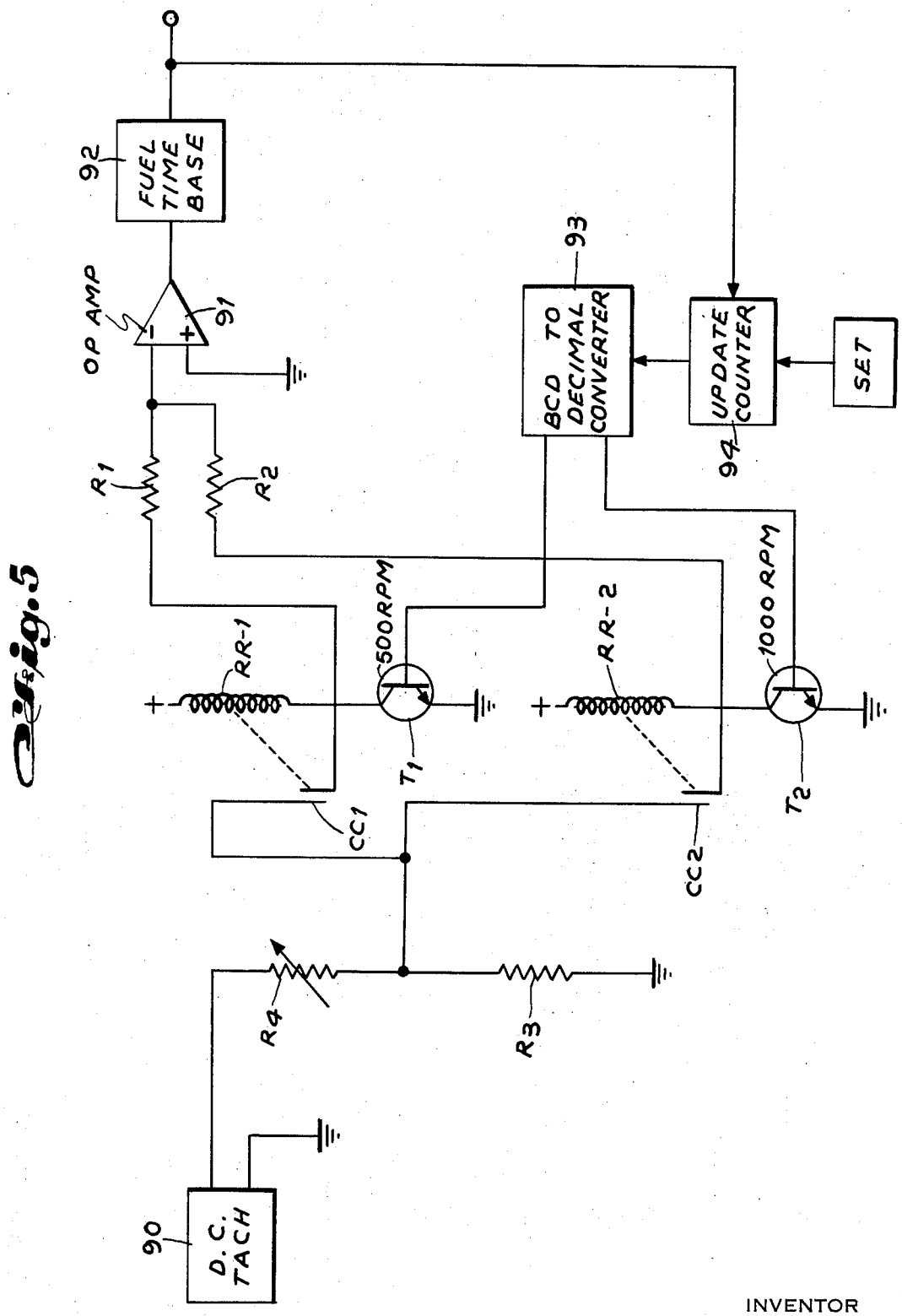

MEASURING FUEL CONSUMPTION

CROSS REFERENCE TO RELATED APPLICATION

This application is related to application Ser. No. 124,098, filed Mar. 15, 1971, now U.S. Pat. No. 3722265, and entitled Engine Performance Computing Arrangement. The assignee of this cross referenced application is the same as that of the instant application.

BACKGROUND OF THE INVENTION

This invention relates to apparatus and methods for measuring fuel consumption, and in particular, to improved apparatus and methods for determining fuel rate measurements of an engine at one or more selectable engine speeds when the engine is accelerating at a constant load condition.

According to the arrangement in the cross reference application, a computing arrangement was described in which the fuel horsepower of an engine under test was calculated and displayed. A programmable network generated a pulse output when a preselected rpm was reached by the engine under test. A control means in response to the output pulse permitted time clocking pulses to be applied to a register to sense the time required for a predetermined number of fuel input pulses to be generated. A fuel consumption meter counting means was coupled to sense the predetermined number of fuel input pulses to be generated. A fuel consumption meter counting means was coupled to sense the predetermined number of fuel input pulses, and storage means stored the total time required to sense the fuel pulses. A programmed calculating arrangement was coupled to the storage means and programmed for computing the fuel horsepower of the engine, and the results of the calculation were displayed in a digital readout. Insofar as the cross reference application is required for a full understanding and to enable one to practice this invention, it is incorporated by reference herein.

The cross referenced application, in essence, was concerned with the measurement of fuel rate wherein it measured the time required for a given volume of fuel to pass through the engine. Accordingly, a considerable amount of novel circuitry and counting techniques were required in order to arrive at the final solution, that being the calculation of engine performance. The proposed methods and embodiments according to the instant invention have been developed to make a fuel measurement directly, so that the calculation of final engine performance can be made easier. In a first embodiment, the fuel rate measurement is at an instant at which the selected rpm is reached which means that the measurement of the fuel rate will occur slightly after the selected rpm. In the second embodiment, the measurement of fuel rate is done continuously, and at the instant the selected rpm is reached a particular registration of fuel consumption is stored.

SUMMARY OF THE INVENTION

It is therefore an object of this invention to provide apparatus and methods for measuring fuel consumption of an engine accelerating at constant load.

Another object of this invention is to provide apparatus and methods of measuring fuel consumption of an engine at one or more selectable engine speeds when the engine is accelerating at a constant load condition.

According to the broader aspects of the invention there is provided a means for measuring fuel rate of an engine including means for selectably detecting a plurality of rpm conditions, means for sequentially registering and storing a measurement of fuel per unit time being consumed at each of the conditions, and means to cause the measurements in response to each rpm condition being reached by said engine.

According to a feature of the invention, the apparatus for measuring fuel consumption of an engine accelerating at constant load comprises a first means for detecting a plurality of predetermined engine rpm speeds, a second means for generating a pulse when each of said speeds is reached, a third means responsive to said pulse for registering and storing an indication of the quantity of fuel per unit time being consumed at each of said plurality of speeds, and fourth means responsive to said third means to control said first means, whereby said first means sequentially indicates said plurality of predetermined speeds.

According to a method for measuring fuel consumption of an engine at one or more selectable engine speeds when the engine is accelerating at a constant load condition, the method comprises the steps of detecting a first rpm of a plurality of predetermined rpm speeds, initiating a time base at each detected speed, counting fuel consumption fuel pulses for the detected speed for a period determined by the time base, storing the registered count, and updating the detection to another of the plurality of speeds after storage of the registered count for the first detected speed.

According to another method for measuring fuel consumption of an engine at one or more selectable engine speeds when the engine is accelerating at a constant load condition, the method comprises the steps of activating a free running time base, continuously measuring the fuel rate and updating the measurement in a counting register, clearing the register in a fixed interval of time determined by the time base, detecting a first rpm of a plurality of engine rpm speeds, transferring to a storage register the continuous current rate at the instant the first rpm is detected, and updating the detection to a second rpm and enabling the continuous counting.

BRIEF DESCRIPTION OF THE DRAWINGS

The foregoing and other objects and features of the invention will be more fully understood and appreciated upon consideration of the following detailed description of apparatus organized in accordance therewith, the description being intended to be read in conjunction with the accompanying drawings, in which:

FIG. 1 illustrates the curve for fuel rate versus rpm useful in understanding the operation of the apparatus for a first embodiment;

FIG. 3 is a curve useful in understanding the invention according to a second embodiment;

FIG. 4 is a block diagram of the apparatus for measuring fuel consumption of an engine at one or more selectable speeds for the second embodiment; and FIG. 5 illustrates a circuit for use with a DC tachometer which may be used with either one of the embodiments described in connection with FIGS. 2 and 4.

DESCRIPTION OF THE PREFERRED EMBODIMENTS

Figure 2:
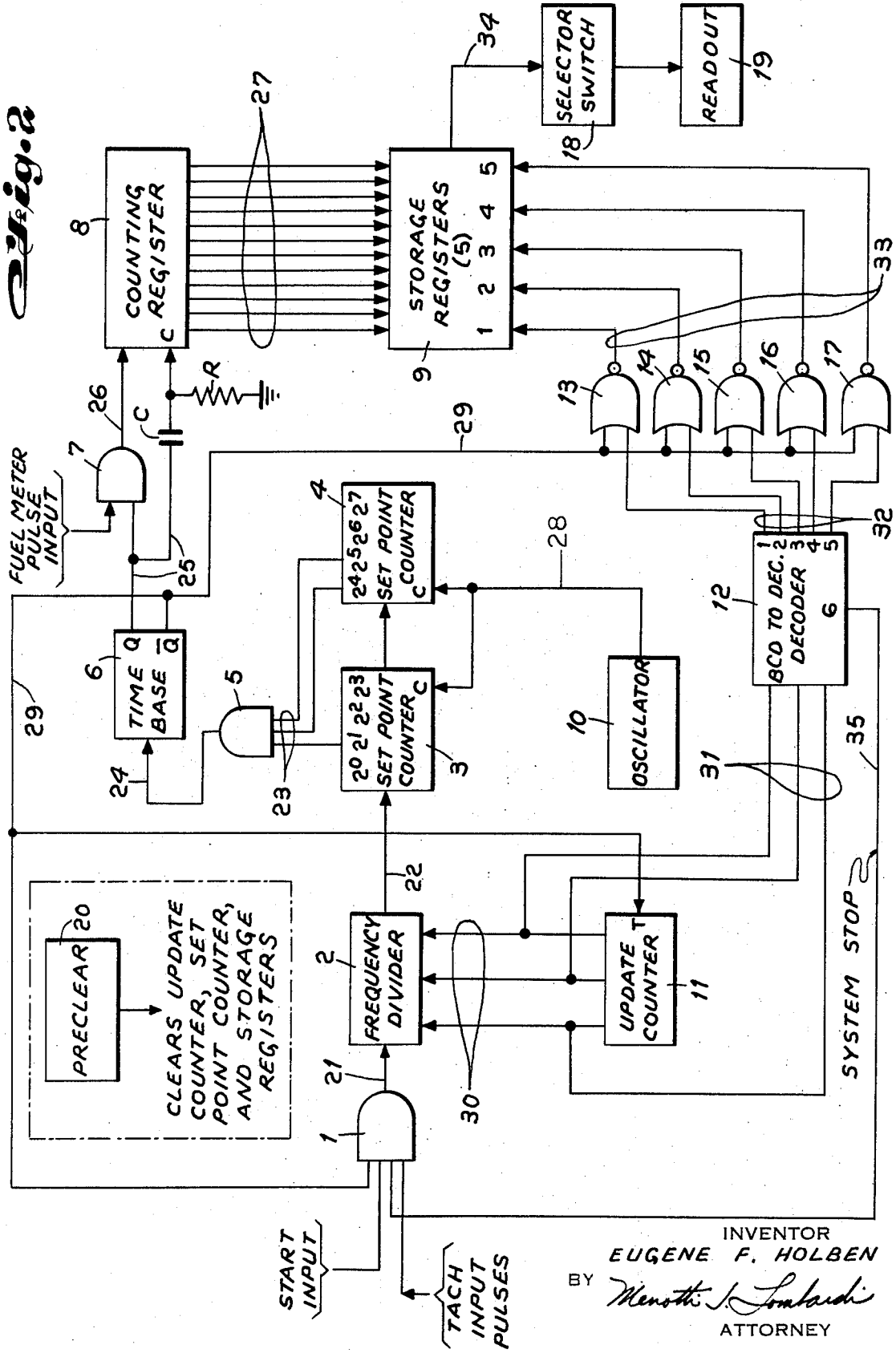
FIG. 2 is a block diagram of the apparatus for the measuring of fuel consumption of an engine at one or more selectable engine speeds according to the first embodiment.

Referring now to FIGS. 1 and 2, a method and apparatus for measuring fuel consumption of an engine at one or more selectable engine speeds is illustrated. For instance, as shown in FIG 1, if an engine is permitted to accelerate at a constant load condition, represented by the curve of fuel rate vs. rpm, it is desirable to measure the rate of fuel consumption at various rpms of the engine. It is recognized that as the engine increases in rpm at some rate of increase, the measurement of the fuel rate must be made quickly. The system of FIG. 2 begins the measurement of fuel rate at the instant the selectable rpm is reached. FIG. 1 shows that at the selectable rpm, for example, 500 rpm, the time for fuel rate measurement is started and the average fuel flow rate occurs slightly after the selected rpm is reached.

The apparatus for implementing this arrangement is illustrated in FIG. 2. The arrangement includes an input AND gate 1 which has an engine tachometer input and a start pulse input. The output 21 from AND gate 1 triggers a frequency divider 2 whose output 22 is coupled to set point counters 3 and 4. The output of the set point counters on lines 23 is coupled to AND gate 5, whose output on line 24 triggers time base 6. The Q point of time base 6 is coupled by line 25 to AND gate 7 which also has a digital input from a fuel meter. Such a positive displacement meter which is capable of being used with this invention is disclosed in copending application of T. R. Metz (3), Ser. No. 180,958, filed Sept. 16, 1971 and assigned to assignee of this application. The output from AND gate 7 is coupled by line 26 to trigger the counting register 8. Line 25 also is coupled to the differentiators C and R which clear the counting register 8 to begin the count of fuel pulses. Output lines 27 from the counting register 8 are coupled to five storage registers 9. Oscillator 10 is coupled by lines 28 to clear the set point counters at a predetermined rate. Update counter 11 which is triggered by the $\overline{Q}$ of time base 6 from line 29 is coupled by lines 30 to the frequency divider 2 and by lines 31 to the BCD to decimal decoder 12. The outputs 32 of the decoder 12 are coupled to five NOR gates 13–17 which also have inputs from $\overline{Q}$ of the time base. The outputs 33 from the NOR gates 13–17 are coupled to the five storage registers 9. The output line 34 from the storage register is coupled to a selector switch 18 whose output is terminated on readout 19 where the fuel rate at the various rpm conditions may be indicated. One output point (6) of the decoder 12 is coupled by line 35 to the input of AND gate 1 to serve as a system stop. A preclear 20 clears the update counter, the set point counters, and the storage registers so that another series of readings may be taken and indicated on readout 19.

The operation of the system according to FIG. 2 may be summarized as follows. The engine rpm is measured by a digital tachometer whose output is a certain number of pulses per second directly related to revolutions per minute of the engine. For instance, the tachometer has 30 pulses per revolution of the engine so that at 500 rpm, the rate of pulses is 15,000 pulses/minute or 250 pulses/second. If the period of oscillator 10 is set at 0.2 seconds, then in 0.2 seconds, 50 pulses will be counted by the set point counters 3 and 4 if the frequency divider 2 was set to a divide by one. With the frequency divider 2 set to divide by one, the engine is started from 0 rpm and is accelerated. Each 0.2 seconds, counters 3 and 4 count the pulses until 50 or more is reached. This count is equivalent to 500 rpm of the engine under test. At this instant, the BCD output on lines 23 which is the equivalent of decimal 50 activates AND gate 5 to initiate the time base 6. The Q point of time base 6 is initiated, or goes to a 1 state, and $\overline{Q}$ goes to 0. When Q goes to the 1 state, the differentiators R and C clear the counting register 8 to zero, to begin the count of fuel input pulses which are now permitted to reach the counting register 8 from enabled AND gate 7. The period of time base 6 is set, as described in the cross referenced application, so that the pulses reaching counting register 8 are equivalent to gallons/minute, gallons/hour, or pounds/hour, etc. In the initial state, update counter 11 was set to give a BCD output equivalent to one, or divide by one, which in turn sets the BCD to decimal decoder 12, so that all its outputs on line 32 were in a 1 state except output No. 1 which is in 0 state. When $\overline{Q}$ was in an initial 1 state, all the outputs on lines 33 of NOR gates 13 through 17 were in the 0 state so that each of 5 storage registers 9 were closed. When $\overline{Q}$ went to the 0 state, when 500 rpm was reached, the output of NOR gate 13 goes to the 1 state so that the No. 1 storage register of registers 9 was opened to receive the count from the counting register 8. At the same time that $\overline{Q}$ went to the 0 state, it inhibited the input AND gate 1 by line 29 so that no more pulses from the tachometer could be received to interfere with the counting of fuel pulses. The $\overline{Q}$ pulse is also present at the toggle position of the update counter 11 but does not change the BCD output until $\overline{Q}$ goes back to the 1 state.

After the time base 6 has completed its measurement of time (which is set by the units of fuel rate), the Q point returns to 0 state and $\overline{Q}$ returns to the 1 state. When $\overline{Q}$ returns to the 1 state, it toggles the update counter 11 to the divide by 2 condition. This action gives a BCD number of, for example, 010 which changes the decoder 12 to close channel No. 1 and prepare channel No. 2 to be initiated the next time $\overline{Q}$ goes to the 0 state. At the same time $\overline{Q}$ returned to the 1 state, it opened AND gate 1 to again permit tachometer pulses to be received. Now as the tachometer pulses are received, they are divided by two so that every other pulse is sent to the set point counters 3 and 4. When the count reached 50 or more in the counters, which is now equivalent to 1,000 rpm, the sequence of events occurs again to record and store the fuel rate at 1,000 rpm. This procedure repeats for each 500 rpm increments until the decoder 12 reaches channel 6 which goes to the 0 state and inhibits AND gate 1 which stops all further recording of tachometer input pulses. No further initiation can occur until the preclear 20 is initiated.

At this point, the test would be terminated and selector switch 18 would be set to sequentially read out on the readout 19 the fuel rate at the various rpm conditions.

Referring now to FIGS. 3 and 4, another embodiment according to the invention is described for measuring fuel consumption of an engine at one or more selectable engine speeds. For example, as illustrated in FIG.

3, if an engine is permitted to accelerate at a constant load condition it is desirable to measure the rate of fuel consumption at the various rpms of the engine to provide a fuel rate vs. rpm curve as illustrated. It is recognized that as the engine increases in rpm, at some rate of increase, the measurement of fuel rate must be made rapidly and at a time which can be averaged so that it can be considered to be representative of the exact rate at the exact rpm. This embodiment continuously measures fuel rate and stores the continuously updated rate in a counting register. This continuously current rate is transferred to a storage register at the instant the selected rpm is reached. The average fuel flow rate can now occur either slightly before the selected rpm, slightly after the selected rpm or at the exact selected rpm. The apparatus for an implementation of this embodiment is illustrated in connection with FIG. 4.

An input AND gate 41 includes a start input and a tachometer input. The gate 41 output by line 67 is coupled through to frequency divider 42 which in turn is coupled by line 68 to set point counters 43 and 44. The output from set point counters 43 and 44 is coupled by lines 69 to NAND gate 45. A time base 46 has its Q point coupled by line 70 to the clear point of the set point counters and to the counting register clear 48. A capacitor C is tied to ground at this point. $\bar{Q}$ of the time base 46 is connected by line 71 to the input AND gate 41 and AND gate 47 which also has an input from the fuel meter. The fuel meter may be of the type as indicated in the T. R. Metz (3) copending application. AND gate 47 output on line 72 is coupled to the counting register 48 whose outputs on lines 73 are coupled to the five storage registers 49. OR gate 50 toggles by line 74 update counter 51 whose BCD outputs on line 75 are coupled to the frequency divider 42 and by lines 76 the BCD to decimal decoder 52. Output channels 1–5 of decoder 52 are coupled by lines 77 to NOR gates 53–57. NOR gates 53–57 also have inputs from line 78 connected to $\bar{Q}$ of flip-flop 60 which is toggled from NAND gate 45 by line 79 and cleared by line 80 from the $\bar{Q}$ point of time base 46. Line 81 couples the Q point of time base 46 to the NOR gates inputs 53–57. The outputs on line 82 of NOR gates 53–57 are coupled to sequentially enable the five storage registers 49, and by lines 83 are coupled to the five inverters 61–65 and through to OR gate 50. The outputs from storage registers 49 are coupled by line 84 to selector switch 58 whose output is coupled to readout 59. The system is stopped by channel 6 of decoder 52 which is connected by line 85 to input AND gate 41. A preclear 66 clears the update counter, the set point counters, and the storage registers.

The functional operation of the described system may be summarized as follows. The engine rpm is measured by a digital tachometer whose output is a certain number of pulses per second directly related to revolutions per minute. For instance, the tachometer has 30 pulses per revolution of the engine so that at 500 rpm the rate of pulses is 15,000 pulses/minute or 250 pulses/second. If the period of time base 46 is set to 0.2 seconds, then in 0.2 seconds, 50 pulses would be counted by the set point counters 43 and 44 if the frequency divider 42 was set to divide by one. With the frequency divider 42 set to divide by one, the engine is started from 0 rpm and is accelerated. Each 0.2 seconds, the counters 43 and 44 count the pulses until 50 or more is reached. At this instance, the BCD output of the decimal 50 activates the NAND gate 5 which is connected to the toggle flip-flop 60.

At the same time that the tachometer pulses are being continuously counted, a free running time base 46 has been activating AND gate 47 to continuously measure fuel input pulses from the fuel meter. The time base 46 is designed to give a short period clear pulse at a fixed interval of time, every 0.2 seconds in this example. The Q terminal coupled by line 70 clears the counting register 8 cyclically every 0.2 seconds so that the number of pulses in the counting register 8 is always the latest fuel rate counted. When $\bar{Q}$ is at one state fuel pulses are counting. If, during the cycled counting of fuel pulses, the set point counters 43 and 44 reach 50, NAND gate 45 is enabled, the $\bar{Q}$ of flip-flop 26 goes to 0 state which opens NOR gate 53. This was previously set by the condition of decoder 52, since update counter 51 is also in a divide by one condition. The No. 1 storage register 9 now reads the current count of fuel rate pulses until $\bar{Q}$ of the time base 46 returns to the 0 state. At this instant, flip-flop 60 returns to 1 state, locking the last fuel numbers in storage position 1, clearing the counting register to 0, momentarily inhibiting AND gate 41 to prevent further reading of tachometer pulses. As soon as any one of the outputs of the NOR gates 53 to 57 opened momentarily to store pulses, the output of OR gate 50 went to a 0 state. When the NOR gates 53–57 returned to their original conditions, at instant $\bar{Q}$ of time base 46 went to 0 state to complete fuel pulse counting, the output of OR gate 50 returned to a 1 state which switched update counter 51 to divide by two and reset decoder 52 by lines 76 to the channel No. 2 position. This entire procedure repeats itself continuously until decoder 52 reaches channel No. 6 position which inhibits by line 85 AND gate 41 and stops all further testing until preclear 66 is activated.

At this point, the test would be terminated and selector switch 18 activated to sequential read out on the readout 19 the fuel rate at the various rpm conditions.

FIG. 3 shows that there would be an under register or over register limit of error which would depend upon the point at which the 50 counts was reached in relation to the time base counting of fuel pulses. In any event, any reading by this embodiment would be less in error than the first embodiment, but it would be variable.

FIG. 5 shows an arrangement which can be incorporated into the described embodiments wherein the indicated type tachometer input is replaced by a DC type tachometer input. Referring now to FIG. 5, a DC tachometer 90 has its plus terminal connected across variable resistor R4 and fixed resistor R3. The midpoint of the resistors is connected through contact CC1 of relay RR1 to resistor R1 and to the negative terminal of operational amplifier 91. The midpoint between resistor R4,R3 is also connected by contact CC2 of relay RR2 to resistor R2 and to the negative input of the operational amplifier 91. The output of the operational amplifier is connected to the fuel time base 92 whose output is used to update counter 94 which is coupled to converter 93. One output from converter 93 controls transistor T1 which is turned on at 500 rpm and the other output from converter 93 is coupled to transistor T2 which is activated at 1,000 rpm.

This circuit permits the use of a DC tachometer with either of the embodiments previously described. In this arrangement, the converter sets either transistor T1 or T2 for a particular selectable rpm. With the selected transistor turned on, the associate relay is activated and contacts to the DC tachometer are closed to couple the voltage through the associated dropping resistor and to the operational amplifier. The dropping resistor is selected so that the turn on voltage level of the operational amplifier occurs at the selected rpm of the engine. The operational amplifier then initiates the fuel time base as previously described in connection with the two embodiments.

Although we have described above the features of the invention in connection with a specific example, it should be clearly understood that this description is made only by way of example and not as a limitation on the scope of the invention as set forth in the objects and features thereof and in the accompanying claims.

I claim:

1. Means for measuring fuel rate of an engine comprising:
   first means for selectably detecting a plurality of rpm conditions;
   means for generating signals representative of fuel per unit time being consumed;
   second means for registering and storing the signals representative of fuel per unit time being consumed at each of the plurality of conditions; and
   means coupled to said first and second means to cause the registering and storing in response to each rpm condition being reached by said engine, whereby the stored signals represent the measured fuel rate of the engine.

2. The means of claim 1 including means for selectably indicating each of said stored signals.

3. Apparatus for measuring fuel consumption of an engine accelerating at a constant load comprising:
   first means for detecting a plurality of predetermined engine rpm speeds;
   second means for generating a pulse when each of said speeds is reached;
   means for generating signals corresponding to fuel consumption rates;
   third means responsive to said pulse for registering and storing the signals at each of said plurality of speeds; and
   fourth means responsive to said third means to control said first means, whereby said first means sequentially detects said plurality of predetermined speeds.

4. The apparatus of claim 3 including fifth means responsive to said fourth means to cause sequential storage of each registered fuel consumption signal.

5. Apparatus for measuring fuel consumption of an engine at one or more selectable engine speeds when the engine is accelerating at a constant load condition, comprising:
   means for detecting a first rpm of a plurality of predetermined engine rpm speeds;
   a time base generating means;
   means for generating fuel consumption pulses;
   means for initiating said time base means at each detected speed;
   means for counting the fuel pulses for said detected speed for a period determined by said time base means;
   means for storing the registered count of the fuel pulses; and means for updating the detection to a second rpm of said plurality after storage of the registered count for said first rpm.

6. Apparatus for measuring fuel consumption of an engine at one or more selectable engine speeds when the engine is accelerating at a constant load condition comprising:
   means for generating a free running time base signal and fuel consumption rate pulses;
   a counting register for continuously registering the fuel consumption rate pulses and updating the rate in said counting register;
   means for clearing the counting register in a fixed interval of time determined by said time base signal;
   means for detecting a first rpm of a plurality of engine rpm speeds;
   a storage register and means coupled for causing transfer to said storage register of the fuel consumption rate pulses registered at the instant the first rpm is detected; and
   means for updating the detection to a second rpm of said plurality, and the fuel consumption rate pulse registering continues in said counting register for said second rpm, whereby the fuel rate of the engine is measured and stored at selected speeds.

7. Apparatus for measuring for said second rpm fuel rate of an engine accelerating at a constant load comprising:
   first means for detecting a plurality of predetermined engine rpm speeds;
   second means for generating a pulse when each of said speeds is reached;
   means for generating pulses indicating the quantity of fuel per unit time being consumed by the engine;
   third means responsive to said pulse for registering and storing the pulses indicating the quantity of fuel per unit time being consumed at each of said plurality of speeds;
   fourth means responsive to said third means to control said first means, such that said first means sequentially detects said plurality of predetermined speeds;
   fifth means responsive to said fourth means to cause sequential storage of each registered indicating pulses; and sixth means for selectably reading out each of stored indicating pulses.

8. A method of measuring fuel consumption of an engine at one or more selectable engine speeds when the engine is accelerating at a constant load condition, comprising:
   detecting a first rpm of a plurality of predetermined engine rpm speeds;
   generating a time base signal and fuel consumption pulses at each detected speed;
   counting the fuel pulses for said detected speed for a period of time determined by said time base signal;
   storing the registered count of the fuel pulses; and updating the detection to a second rpm of said plurality after storage of the registered count for said first rpm.

9. A method of measuring fuel consumption of an engine at one or more selectable engine speeds when the engine is accelerating at a constant load condition, comprising:

generating a free running time base signal and fuel consumption rate pulses;

continuously registering the fuel consumption rate pulses and updating the pulses in a counting register;

clearing the register in a fixed interval of time determined by said time base signal;

detecting a first rpm of a plurality of engine rpm speeds;

transferring to a storage register the fuel consumption rate pulses registered at the instant the first rpm is detected; and updating the detection to a second rpm of said plurality and enabling the registering of the fuel consumption rate pulses in said counting register for said second rpm.

* * * * *